UNITED STATES PATENT OFFICE.

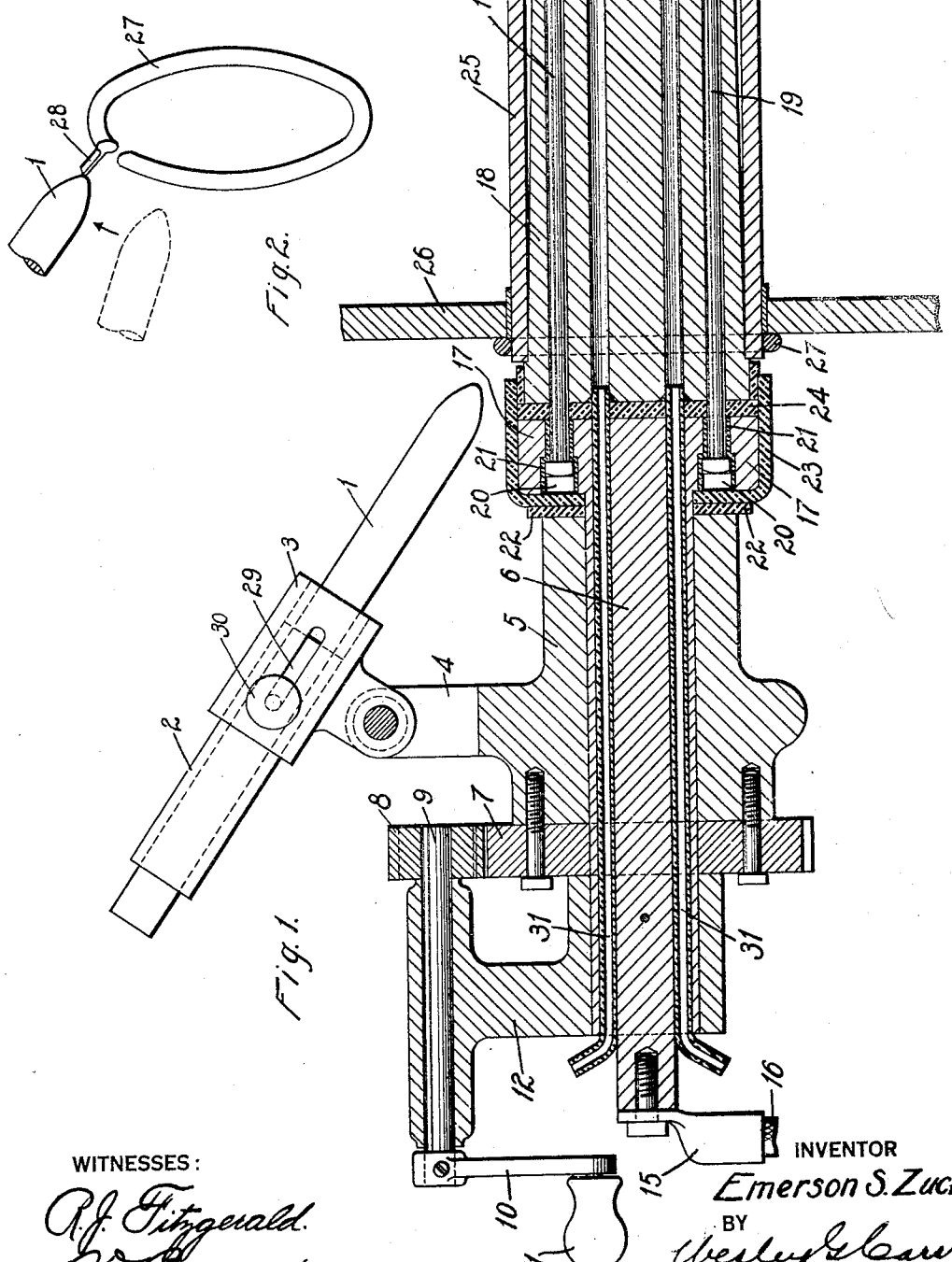

EMERSON S. ZUCK, OF WILKINSBURG, PENNSYLVANIA, ASSIGNOR TO WESTINGHOUSE ELECTRIC AND MANUFACTURING COMPANY, A CORPORATION OF PENNSYLVANIA.

ARC-WELDING APPARATUS.

1,233,434.  Specification of Letters Patent.  Patented July 17, 1917.

Application filed December 4, 1915. Serial No. 65,032.

*To all whom it may concern:*

Be it known that I, EMERSON S. ZUCK, a citizen of the United States, and a resident of Wilkinsburg, in the county of Allegheny and State of Pennsylvania, have invented a new and useful Improvement in Arc-Welding Apparatus, of which the following is a specification.

My invention relates to arc welding apparatus and it has special relation to apparatus for welding hollow bodies, such as boiler tubes and the like, to boiler fire sheets or other adjacent plates.

The object of my invention is to provide a device of the above-indicated character which shall be simple in construction and convenient in manipulation and which shall produce welded joints with accuracy, speed and uniformity.

In the accompanying drawing, Figure 1 is a longitudinal sectional view of a device constructed in accordance with my invention, showing the manner in which the device is applied to welding boiler tubes, and Fig. 2 is a fragmentary perspective view showing an arrangement for automatically establishing welding arcs in the operation of my device.

The illustrated form of my device consists essentially of a rotary electrode carrier mounted upon a support that is adapted to be thrust into a boiler tube or other hollow body, the electrode being then in position to direct its arc adjacent to the end of the tube. I provide also simple manually-operated mechanism for rotating the electrode holder around the axis of the tube in such a manner that a finished weld is completed by one revolution of the holder.

Referring to the accompanying drawing, a welding electrode 1 is carried by a holder 2 which is slidably mounted in a tubular support 3, the support 3 being pivotally attached to a yoke 4 projecting from one side of a metallic sleeve 5 that is rotatably mounted upon a shaft 6. The sleeve 5 carries a gear 7 meshing with a driving pinion 8 mounted on a shaft 9 to which is attached a crank 10 having a handle 11. The shaft 9 is supported in bearings in a bracket 12 which is mounted upon the shaft 6 and may be insulated therefrom.

To the outer end of the shaft 6 is attached a terminal connector 15 which may be connected to one terminal of a welding generator through a conductor cord 16. The inner end of the shaft 6 is enlarged at 17 for attachment to a support 18 which is attached to the enlarged inner end of the shaft 6 by means of bolts 19, the heads of which are received in depressions 20 in the enlargement 17. The depressions 20 are lined with insulating material, as shown at 21, and the adjacent portions of the shaft 6 and the support 18 are separated by insulating sheets 22, 23 and 24, the sheet 23 being bent over the enlarged end 17 of the shaft 6 to shield this part of the shaft from the welding arc.

As shown in the drawing, the support 18 is thrust into the open end of a boiler tube 25 which is to be welded to the adjacent fire sheet 26. Filling material for the joint is provided by a metallic ring 27 which surrounds the end of the tube adjacent to the wall and is progressively melted by the revolving arc to form a tight joint between the tube and the boiler wall. The ring 27 may conveniently be provided with an outwardly-extending tongue 28, as shown in Fig. 2, which projects into the path of the electrode 1. The tongue 28 should be so proportioned and placed that it is engaged momentarily by the moving electrode at the beginning of the operation of the device and thereby serves to establish the welding arc. If this starting arrangement is not employed, it is necessary to reciprocate the electrode into contact with the work and back again in order to establish the arc. For this purpose, the tubular support 3, which carries the electrode holder 2, is provided with a slot 29 which receives the shank of a button 30 attached to the holder 2. The holder is spring-pressed or otherwise yieldingly maintained in the position shown.

The support 18 is slightly tapered in order to facilitate its introduction into the tube 25 and should be made of copper or some other material of good heat-conductivity, in order that the heat developed in the welding operation may be dissipated without warping or straining the fire sheet. For the same purpose, the device may be provided with a set of openings 31 through which cooling water may be circulated. As shown, these openings are joined by a tube 32, and the portions of the tubes adjacent to the shaft 6 should be lined with insulating material in order to prevent the circulating water from short-circuiting the welding current.

In the operation of my device, the support 18 is thrust into a boiler tube, with the parts in the relation shown, and current is supplied through the terminal 15 to the shaft 6 and thence passes to the electrode 1. The welding arc is established either by revolving the electrode into contact with the projection 28 of the ring 21 or by reciprocating the electrode toward the ring 27 by means of the button 32. The current passes from the ring 27 to the boiler wall 26 and thence to the ground, a suitable grounding connection being preferably provided. The handle 11 is then turned at a regular speed, thereby causing the sleeve 5 to rotate upon the shaft 6 and to carry the electrode in a circular path around the boiler tube. The ratios of the pinion 8 and the gear 7 are so selected that the arc is moved at the proper speed to thoroughly melt the ring 27, as it progresses, and thereby to form a perfect joint. The proper speed for rotating the handle 11 will be readily determined by the operator after a few trials.

While the device which I have shown and described is useful for many different welding operations, it is of special advantage for the purpose mentioned above; that is, the welding of boiler tubes to their fire sheets. This operation has usually been performed heretofore by welding methods using metallic electrodes that are manipulated by hand, and the quality of the work has varied greatly on account of the variations in skill of the operators. The successful operation of my present device depends but little upon the ability of the workman, and, therefore, the results produced are substantially uniform.

My device may readily be adapted to move the welding electrode in closed paths of rectangular or other polygonal form instead of in a circular path, as in the device described above, and the structural details of my device may be otherwise variously modified by persons skilled in the art without exceeding the limits of my invention. It is therefore to be understood that my invention is restricted only by the scope of the appended claims.

I claim as my invention:

1. An arc welding device comprising a portable support, an electrode mounted thereon, and means for moving the said electrode relatively with respect to the said support and in a closed path corresponding to the outline of the joint to be welded.

2. An arc welding device comprising a support, an electrode mounted thereon and means for moving the said electrode relatively with respect to the said support and in a circular path corresponding to the outline of the joint to be welded.

3. An arc welding device comprising a support of generally cylindrical form, an electrode mounted thereon and revoluble around the axis of the said support, and means for revolving the said electrode around the said axis.

4. An arc welding device comprising a support, a sleeve rotatably mounted upon the said support, a welding electrode pivotally secured to the said sleeve, and means for supplying electric current to the said support.

5. An arc welding device comprising a support, a sleeve rotatably mounted upon the said support and carrying a welding electrode, and means for rotating the said sleeve.

6. An arc welding device comprising a support, a sleeve rotatably mounted upon the said support and carrying a welding electrode, a gear secured to the said sleeve, a pinion meshing with the said gear and mounted upon a relatively stationary shaft, and manually operable means for rotating the said shaft.

7. An arc welding device comprising a tapered support, a cylindrical member secured to the said support in alinement therewith and electrically insulated therefrom, a sleeve mounted on the said member and carrying a welding electrode, manually operable means for rotating the said sleeve, and means for applying cooling fluid to the said support and the said member.

8. An arc welding device comprising a support, a cylindrical member having an enlarged end disposed adjacent to the said support, a sleeve rotatably mounted upon the said cylindrical member and carrying a welding electrode, insulating material interposed between the said support and the said member and surrounding the enlarged end of the said member, and means for rotating the said sleeve.

9. Arc welding apparatus comprising a movable electrode and a body of filling material disposed adjacent to the joint to be welded and having a portion extending from the main body of filling material into the path of movement of the said electrode.

10. Arc welding apparatus comprising a movable electrode and a body of filling metal disposed adjacent to the joint to be welded and having a tongue projecting into the path of movement of the said electrode.

11. Arc welding apparatus comprising a movable electrode and an annular body of filling material disposed adjacent to the joint to be welded and having a tongue projecting into the path of movement of the said electrode.

In testimony whereof, I have hereunto subscribed my name this 30th day of Nov., 1915.

EMERSON S. ZUCK.

Copies of this patent may be obtained for five cents each, by addressing the "Commissioner of Patents, Washington, D. C."